United States Patent Office 3,127,139
Patented Mar. 31, 1964

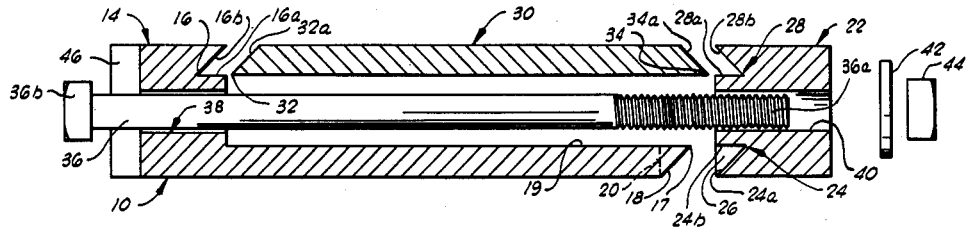
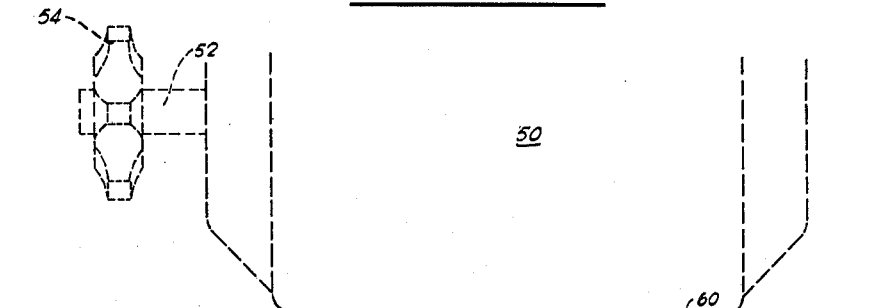
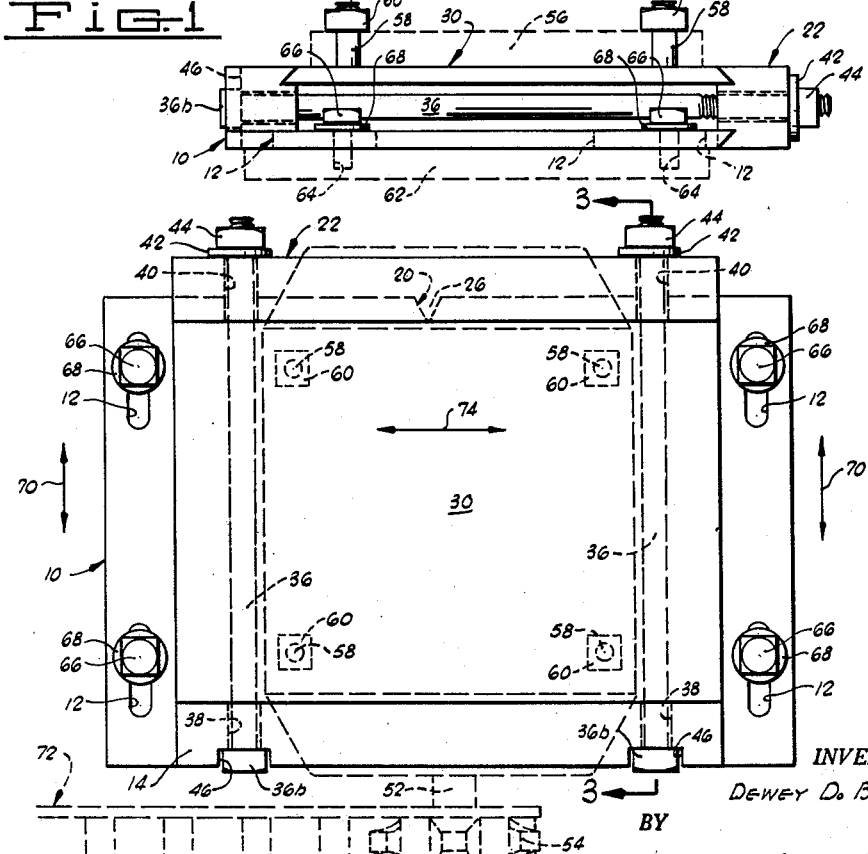

3,127,139
ADJUSTABLE ENGINE MOUNT
Dewey D. Bittle, 106 S. 10th, Tonkawa, Okla.
Filed Jan. 30, 1961, Ser. No. 85,825
2 Claims. (Cl. 248—23)

The present invention relates to adjustable engine mounts and in particular, but not by way of limitation, relates to an adjustable engine mount for a small vehicle having an internal combustion engine power source with a chain or belt for transmitting the power to the drive wheels of the vehicle.

A new type of powered vehicle usually referred to as a "Kart" has recently come into extensive use for sport racting. The vehicles are normally four to six feet in overall length, two to four feet in overall width, have four road wheels, the necessary guidance, engine and brake controls, and carry one person. The vehicles are usually powered by one or two small internal combustion engines which are directly coupled to one or both of the rear wheels by chains and sprockets. The vehicle chassis are made in many different sizes and designs and are used interchangeably with many models and sizes of engines.

In the course of a long race it is frequently desirable or necessary to replace a malfunctioning engine in a minimum of elapsed time. In the course of normal maintenance of the vehicles for general sport other than racing, it is frequently necessary to remove an engine from a vehicle for repair, for substitution of another engine, to install drive sprockets of different reduction ratios, and to make various adjustments of the drive chains.

In accordance with the present invention, a base plate having an elongated integral jaw extending along one edge is attached to a vehicle. A second similar jaw member is mated to the opposite edge of the base plate. A pair of parallel channel ways are provided in the opposing faces of the jaw members and an engine support plate having two parallel edges is received in the parallel channel ways. The two jaw members are then moved together by screw means to clamp the second jaw member against the edge of the base plate and the engine support plate to hold the engine support plate in position.

Therefore, an important object of the present invention is to provide an engine mount of the type described which will permit the engine mounted thereon to be quickly disconnected and replaced with a minimum of effort and elapsed time.

Another object of the present invention is to provide an engine mount which is easily and quickly adjustable in a precise, predetermined direction to tighten a chain or belt and yet maintain the chain or belt in proper alignment.

Another object of the present invention is to provide an engine mount of the type described which can readily be installed on almost any type vehicle to support almost any make and model engine.

Another object of the present invention is to provide an engine mount of the type described which is sufficiently adjustable to eliminate the need for disconnect links in the drive chain associated with the engine supported by the mount.

Still another object of the present invention is to provide an engine mount of the type described which is resilient and provides a vibration absorbing effect.

Another object of the present invention is to provide a simplified engine mount of the type described which is easily and cheaply manufactured.

Another object of the present invention is to provide an engine mount of the type described which is less likely to loosen due to engine and road vibrations.

Another object of the present invention is to provide an engine mount of the type described having the advantages mentioned which is a compact unit with no vertically protruding parts requiring special accommodation by the vehicle or engine mounted thereon.

Another object of the present invention is to provide an engine mount of the type described which can readily be installed on either side of a vehicle of the type described.

Additional objects and advantages of the present invention will be apparent from the following detailed description and drawings wherein:

FIGURE 1 is an end view of a motor mount constructed in accordance with the present invention showing a supported engine in dotted outline.

FIGURE 2 is a top view of the device of FIG. 1.

FIGURE 3 is an exploded cross-sectional view taken substantially on lines 3—3 of FIG. 2.

Referring now to the drawings, a base plate 10 is preferably rectangular in shape and has four elongated bolt slots 12, two at each end thereof, disposed in general parallel relationship and extending transversely of the plate 10. An elongated jaw member 14 extends longitudinally of the base plate 10 and along one edge thereof. The member 14 as shown is integral with the base plate 10 but can be rigidly secured to the base plate 10 in any suitable manner. The elongated jaw member 14 is provided with a V-shaped female channel way 16 having a lower planar surface 16a and an upper planar surface 16b. The edge 17 of the base plate 10 opposite the jaw 14 has a beveled face 18 as shown. The edge 17 is preferably parallel to the V-shaped channel 16 as defined by the intersection of the planar faces 16a and 16b. The lower face 16a of the channel 16 is preferably parallel to the base plate 10. The face 18 is provided with a vertical groove 20 shown by dotted line in FIGS. 2 and 3.

A second elongated jaw member 22 is separable from the base plate 10 and is substantially the same length as jaw member 14. Jaw member 22 is provided with a second V-shaped female channel way 24 having planar faces 24a and 24b. Planar face 24a is adapted to mate with face 18, with face 24b resting on face 19 of base plate 10. Channel way 24 is also provided with a key 26 adapted to be received in slot 20. A third V-shaped female channel way 28 has two planar faces 28a and 28b. The lower face 28a is preferably parallel to the upper face 24b of channel way 24. Therefore, when the face 24b is mated with and resting upon the upper surface 19, the V-shaped female channel ways 16 and 28 are parallel, and face 28a is substantially parallel with face 16a.

An engine support plate 30 is generally rectangular in shape and has two parallel edges 32 and 34. The edges 32 and 34 have upwardly converging beveled faces 32a and 34a, respectively, which are adapted to mate with the upper faces 16b and 28b of the V-shaped channel ways 16 and 28, respectively, when the edges 32 and 34 are received in the respective channel ways.

A pair of bolts 36 having threaded ends 36a and preferably square heads 36b extend through bores 38 in the fixed jaw member 14 and bores 40 in the elongated jaw member 22. Washers 42 are placed around the threaded ends of the bolts and nuts 44 are threaded onto the threads 36a. The square boltheads 36b are received in grooves 46 cut vertically in the jaw portion 14 of the base 10. The grooves 46 are so dimensioned that the boltheads 36b cannot turn when received in the grooves.

To install a typical engine 50, shown in dotted outline in FIGS. 1 and 2, having a drive shaft 52 with a drive chain sprocket 54, the engine is securely and rigidly connected to engine support plate 30 with the drive shaft extending perpendicular to parallel edges 32 and 34 of plate 30. The engine can be connected to plate 30 in any suitable manner, depending upon the base construction of the engine. In the illustrated example, four stud bolts 58 are welded to the plate 30 and pass upwardly through the base 56 of the engine 50. Nuts 60 are then threaded onto the studs 58 and tightened to securely clamp the engine to the plate.

The engine mount is then assembled as shown in FIG. 1 with edge 18 of base plate 10 received in channel way 24 of jaw member 22 and with parallel edges 32 and 34 of engine support plate 30 received in channel ways 16 and 28, respectively. The two bolts 36 are passed through bores 38 and 40 and washers 42. Nuts 44 are then tightened against washers 42 until the two jaw members 14 and 22 are moved together to securely clamp engine support plate 30 in place.

The assembled engine mount is then placed in approximate position on the chassis of the vehicle which is to be driven by the engine. In the illustrated embodiment, plate 62 (shown in dotted outline in FIG. 1) is representative of a plate which is normally provided on a Kart at the position where the drive engine is to be installed. It is to be understood that plate 62 is rigidly and securely connected to a vehicle chassis which, for convenience of illustration, is not shown. The positions of four taps 64 are then marked at approximately the midpoint of each of the four elongated bolt slots 12 and the taps drilled and threaded.

Four bolts 66 are passed through washers 68 and through bolt slots 12 and threaded into the taps 64. The engine mount and engine are then adjusted transversely in the directions of double arrow 70 until the pinion chain sprocket 54 is in direct alignment with a drive sprocket (not shown) mounted on a drive axle of the vehicle (not shown). The engine mount is also adjusted transversely until channel ways 16 and 28, and therefore parallel edges 32 and 34 of the plate 30, are parallel to the drive chain 72 and so that the drive shaft 52 is perpendicular to chain 72. The bolts 66 are tightened securely and the engine mount is then permanently mounted on the chassis because it will normally be unnecessary to change the transverse adjustment of the base plate 10 again.

It will be apparent from the foregoing description that engine 50 can readily be adjusted longitudinally of the base plate 10 in the directions of double arrow 74 simply by loosening the two nuts 44. The key 26 in the channel way 24 remains in the groove 20 to prevent the jaw member 22 from tending to slide with plate 30. If jaw 22 were permitted to slide, it would bind against motor support plate 30. Since the parallel edges 32 and 34 of plate 30 and, consequently, channel ways 16 and 28, are parallel to the drive chain 72, the engine 50 will be moved parallel to drive chain 72 and pinion 54 will always remain in proper alignment. The plate 30 can be completely removed from the channel ways 16 and 28 in either direction and is adjustable over a wide range limited only by the length of the plate 30.

Assume that engine 50 is properly mounted and adjusted for operation and it is desired to remove and replace the engine. Nuts 44 are loosened only enough to allow the plate 30 to slide in the channel ways 16 and 28. Plate 30 and engine 50 are moved to the left, referring to FIG. 2, so that the chain 72 can be removed from the sprocket 54. It will be noted that a disconnect length in the chain 72 is not required. Then plate 30 is normally moved back to the right and removed entirely from the channel ways 16 and 28. Of course, the plate could be removed from the channel ways 16 and 28 by moving the plate 30 to the left if no obstructions are present. If obstructions prevent removal of plate 30 in either longitudinal direction, nuts 44 can be loosened further until the jaws 14 and 22 separate sufficiently that the plate 30 can be lifted vertically.

Each engine to be used in combination with a particular vehicle is mounted on an identical width engine support plate 30. Each engine to be used should be mounted on its respective plate 30 in the same relative position so that the pinion sprocket is automatically aligned with the chain 72 and no transverse adjustment of the base plate 10 is required. Each new engine and plate can then easily be inserted in channel ways 16 and 28. After insertion, plate 30 is merely moved to the left, referring to FIG. 2, until the chain 72 can be placed around pinion sprocket 54 and then moved back to the right until the chain is tight. The two nuts 44 are then tightened to secure plate 30 between jaw members 14 and 22 and the engine change is completed. It will be appreciated that with a minimum of practice the engine change can be completed in a matter of seconds.

It will be noted that even when the nuts 44 have been slightly loosened and engine support plate 30 removed from the channel ways 16 and 28, the jaw member 22 will still be held in position so that plate 30 can easily be reinserted. Upper face 24b of channel way 24 rests on the upper face 19 of base plate 10 and, therefore, is not lowered when the nuts 44 are loosened, which maintians channel way 28 in position level with channel way 16. Also, bolts 36 extend through apertures 40 in a relatively close fit to prevent the jaw member 22 from rocking downwardly. As previously mentioned, the key 26 in slot 20 prevents jaw member 22 sliding along edge 18 which, if allowed to occur, would cause binding against the plate 30. Similarly, when the plate 30 is reinserted in the channel ways 16 and 28, the lower surface of the plate 30 rests on the horizontal lower faces 16a and 28a of channel ways 16 and 28, respectively, so that no special effort is required to hold the motor mount in assembled position while the nuts 44 are being tightened. Each bolthead 36b is retained in a vertical groove 46 so that a wrench is not required to hold the bolthead against turning as each nut 44 is tightened. Therefore, the engine can be pulled in one direction by one hand to tension the chain while the other hand is used to tighten the nuts 44.

The engine support plate 30, which is supported only along two sides, provides a resilient support which reduces engine noise and vibrations transmitted to the chassis of the vehicle. If the nuts 44 are tightened sufficiently, the effect of the V-shaped channel ways 16 and 28 will tend to cause the plate 30 to convex upwardly and thereby increase the resilient effect. Use of V-shaped channel ways 16 and 28 to receive and clamp edges 32 and 34 of plate 30 also reduces the likelihood that vibrations will cause slippage of plate 30 in the channel ways and a loosening of the chain. It will also be noted that the use of V-shaped channel ways provides a compact structure by permitting the greatest thickness of plate 30 to be received within the channel ways while still maintaining the upper surface of the jaws 14 and 22 flush with the upper surface of plate 30.

It is to be understood that while the embodiment heretofore described has particular advantages when used to mount an engine on a Kart, the present invention can be advantageously used to mount any engine, electric motor or similar power source where a belt, chain or similar drive means is employed. Therefore, having thus described a particular embodiment of my invention, it is to be understood that various changes can be made therein without departing from the spirit and scope of my invention as defined by the appended claims.

I claim:

1. An adjustable engine mount comprising a base plate, an elongated first jaw member rigidly connected along one edge of the base plate and projecting above the upper surface of the base plate, a first channel way in the first jaw member facing the opposite edge of the base plate, the opposite edge of the base plate being parallel to the first channel way, an elongated second jaw member having second and third parallel channel ways in one face thereof, the second channel way being adapted to receive the opposite edge of the base plate, an engine support plate having two parallel edges, one edge being received in the first channel way and the other edge being received in the third channel way, and means disposed between the base plate and the motor support plate for pulling the first and second jaw members together to clamp the engine support plate therebetween.

2. An adjustable engine mount comprising a base plate, an elongated first jaw member rigidly connected along one edge of the base plate and projecting above the upper surface of the base plate, the first jaw member having a first V-shaped channel way therein, the first channel way having the lower surface thereof substantially parallel to the base plate, the first channel way facing the opposite edge of the base plate, the opposite edge of the base plate being beveled and parallel to the first V-shaped channel way, an elongated second jaw member having parallel second and third V-shaped channels in one face thereof, the second V-shaped channel having the upper surface thereof parallel to and engaging the upper surface of the base plate and the lower surface mating with the beveled portion of the opposite edge of the base plate, the third V-shaped channel having the lower surface thereof parallel to the upper surface of the base plate, a motor support plate having two parallel edges, one edge being received in the first V-shaped channel way and the other edge being received in the third V-shaped channel way, and screw means disposed between the base plate and the engine support plate for pulling the first and second jaw members together to clamp the engine support plate therebetween.

References Cited in the file of this patent
UNITED STATES PATENTS

| 1,884,370 | Swanson | Oct. 25, 1932 |
| 2,471,120 | Pepin | May 24, 1949 |

FOREIGN PATENTS

| 769,851 | Great Britain | Mar. 13, 1957 |